(12) United States Patent
Ragland et al.

(10) Patent No.: US 7,581,098 B2
(45) Date of Patent: Aug. 25, 2009

(54) METHOD AND APPARATUS FOR SECURE ACCESS TO DEDICATED NETWORK RESOURCES

(75) Inventors: Roderick Ragland, Rockville, MD (US); Frank Kelly, Walkersville, MD (US); Gabriel L. Olariu, Germantown, MD (US)

(73) Assignee: Hughes Network Systems, LLC, Germantown, MD (US)

(*) Notice: Subject to any disclaimer, the term of this patent is extended or adjusted under 35 U.S.C. 154(b) by 806 days.

(21) Appl. No.: 11/087,054

(22) Filed: Mar. 23, 2005

(65) Prior Publication Data
US 2006/0075232 A1    Apr. 6, 2006

Related U.S. Application Data

(60) Provisional application No. 60/615,924, filed on Oct. 5, 2004.

(51) Int. Cl.
*G06F 7/04* (2006.01)
(52) U.S. Cl. .............................. 713/168; 726/2; 380/255

(58) Field of Classification Search ................. 380/283, 380/284
See application file for complete search history.

(56) References Cited

U.S. PATENT DOCUMENTS

| | | | |
|---|---|---|---|
| 6,137,885 A * | 10/2000 | Totaro et al. ................. 380/247 |
| 7,349,371 B2 * | 3/2008 | Schein et al. ............... 370/329 |
| 2002/0101831 A1 * | 8/2002 | Gutman et al. .............. 370/316 |
| 2003/0212827 A1 * | 11/2003 | Saha et al. .................. 709/247 |
| 2004/0139201 A1 * | 7/2004 | Chaudhary et al. .......... 709/229 |
| 2005/0213586 A1 * | 9/2005 | Cyganski et al. ....... 370/395.41 |

* cited by examiner

*Primary Examiner*—Matthew B Smithers
(74) *Attorney, Agent, or Firm*—K&L Gates, LLP (57) ABSTRACT

An approach for providing secure access to inroutes or return channels in a radio communication system including a hub communicating with terminals is disclosed. A quality of service level (QoS) corresponding to one of the terminals is determined. An identifier is assigned to the one terminal for communicating over a set of return channels that are in the direction of the one terminal to the hub. The identifier associates a subset of the terminals with the QoS level; the subset includes the one terminal. This arrangement has particular applicability to a satellite network that provides data communication services.

18 Claims, 6 Drawing Sheets

METHOD AND APPARATUS FOR SECURE ACCESS TO DEDICATED NETWORK RESOURCES

RELATED APPLICATIONS

This application is related to, and claims the benefit of the earlier filing date under 35 U.S.C. § 119(e) of, U.S. Provisional Patent Application Ser. No. 60/615,924 filed Oct. 5, 2004, entitled "Scalable Secure Access to Dedicated Resources in a Communication Network"; the entirety of which is incorporated herein by reference.

FIELD OF THE INVENTION

The present invention relates to communications, and more particularly to an approach for accessing network resources.

BACKGROUND OF THE INVENTION

Modern satellite communication systems provide a pervasive and reliable infrastructure to distribute voice, data, and video signals for global exchange and broadcast of information. These satellite communication systems have emerged as a viable option to terrestrial communication systems for carrying data traffic (e.g., Internet traffic) as well as telephony traffic. However, because of spectral limitations, satellite communication systems are bandwidth constrained relative to terrestrial networks. This constraint is further heightened in that modern data applications, which can include multimedia and real-time application, consume a tremendous among of bandwidth. Accordingly, efficient management of network capacity is vital.

The open, broadcast nature of satellite systems makes such systems more susceptible to theft of network capacity and services. Traditionally, to combat unauthorized access to network resources and services, strict registration procedures and measures have been implemented. Unfortunately, these procedures and measures require knowledge of all authorized terminals at the hub. Consequently, the addition of a terminal can entail modification of software and/or hardware at the hub. This severely impacts the scalability of the communication system, given the heavy cost of adding terminals.

Based on the foregoing, there is a clear need for improved approaches for capacity management. There is also a need for an approach that ensures proper access to network resources, in a manner that enhances scalability.

SUMMARY OF THE INVENTION

These and other needs are addressed by the present invention, wherein an approach is provided for secure access to resources of a radio communication system, such as a satellite network.

According to one aspect of the present invention, a method for providing secure access to resources in a radio communication system including a hub communicating with a plurality of terminals is disclosed. The method includes determining a quality of service level (QoS) corresponding to one of the terminals. The method also includes assigning an identifier to the one terminal for communicating over one of a plurality of return channels that are in the direction of the one terminal to the hub. The identifier associates a subset of the terminals with the QoS level; the subset includes the one terminal.

According to another aspect of the present invention, a method for accessing resources in a radio communication system is disclosed. The method includes retrieving an assigned identifier that maps to one or more return channels of the radio communication system, wherein the assigned identifier associates a subset of terminals in the radio communication system with a quality of service (QoS) level. The method also includes selecting, based upon the assigned identifier, the one or more of the return channels for transmission of data.

According to another aspect of the present invention, an apparatus for accessing resources in a radio communication system is disclosed. The apparatus includes a memory configured to store an encrypted string. The apparatus also includes a processor configured to extract a time stamp and an identifier from the encrypted string, wherein the identifier maps to one or more return channels of the radio communication system and associates a subset of terminals in the radio communication system with a quality of service (QoS) level.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A method, apparatus, and software for providing secure access to resources in a satellite communication system are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

The present invention provides secure access to inroutes or return channels of a satellite communication system. Return channel bandwidth is allocated using identifiers based on Quality of Service (QoS) levels as dictated by service level agreements. Each of the identifier maps to one or more return channels, and can be assigned to terminals during installation. A hub transmits a signed string, using an encryption key unique to a particular terminal, to the particular terminal. In operation, the terminal generates an encrypted string using the unique encryption key based on its identifier, and compares the generated string with the one received from the hub. A successful match permits the terminal to utilize the return channels corresponding to the identifier. However, a non-match can result in the terminal being defaulted to a lowest QoS level. Such an approach advantageously simplifies the configuration processes at the hub and curbs any attempts of inroute bandwidth theft.

Although the present invention is discussed with respect to a satellite communication system, it is recognized by one of ordinary skill in the art that the present invention has applicability to any type of radio communication system.

Figure 1:
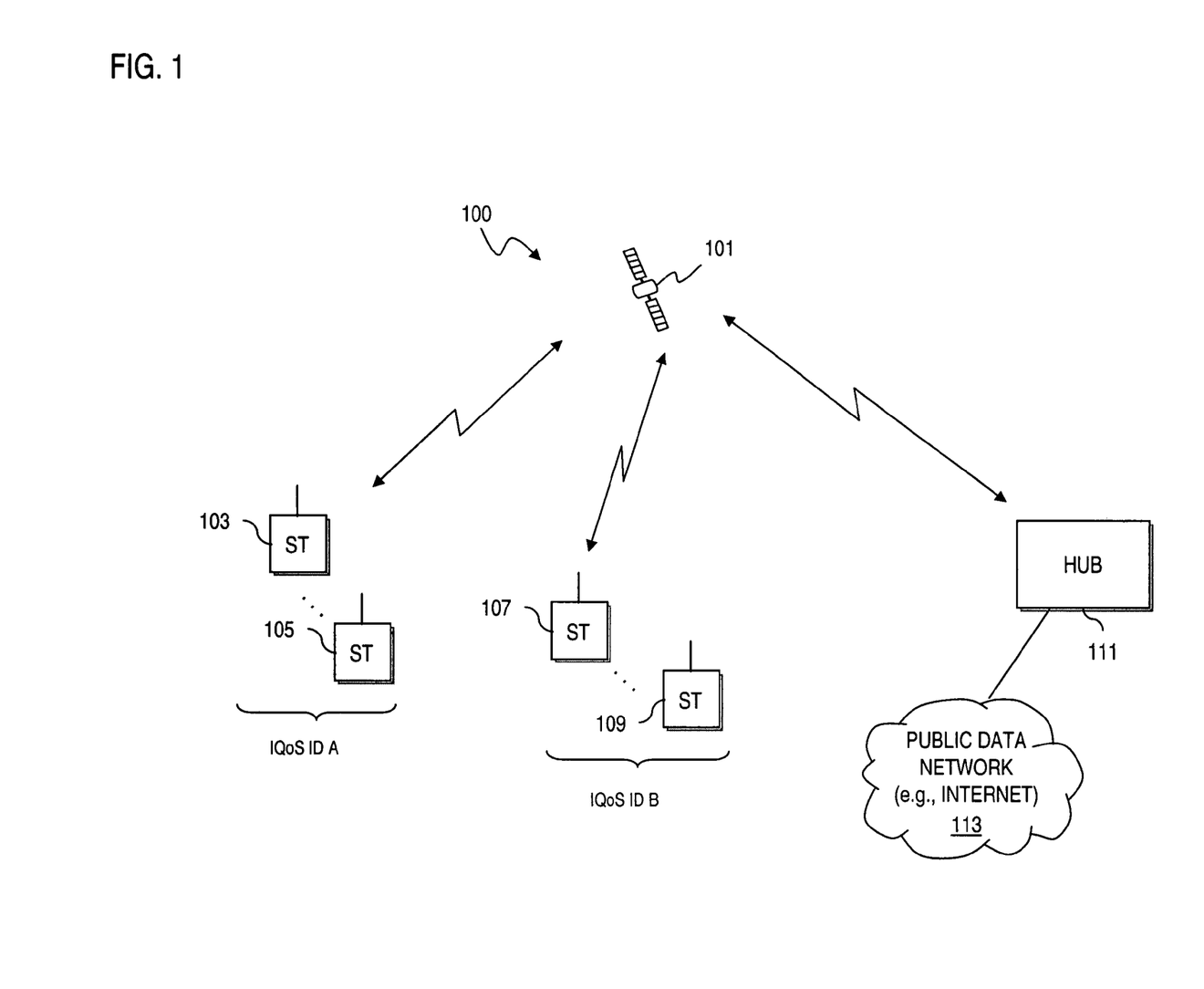
FIG. 1 is a diagram of a satellite communication system capable of providing scalable secure access to system resources, according to an embodiment of the present invention.

FIG. 1 is a diagram of a satellite communication system capable of providing scalable secure access to system resources, according to an embodiment of the present invention. A satellite communication system 100 utilizes a satellite 101 to transmit information, bi-directionally, to and from satellite terminals (STs) 103, 105, 107, 109 and a hub 111. In an exemplary embodiment, the hub 111 operates as part of a Network Operations Center (NOC). Typically, the various STs 103, 105, 107, 109 are associated with different subscribers. By way of example, STs 103 and 105 are under control of Enterprise A, while STs 107 and 109 belong to Enterprise B. In the system 100, the STs 103, 105, 107, 109 originate traffic from a particular coverage area and may exchange data among themselves as well as other STs (not shown). In an exemplary embodiment, the STs 103, 105, 107, 109 are Very Small Aperture Terminals (VSAT), and can provide access to a public data network 113, such as the Internet.

Figure 2:
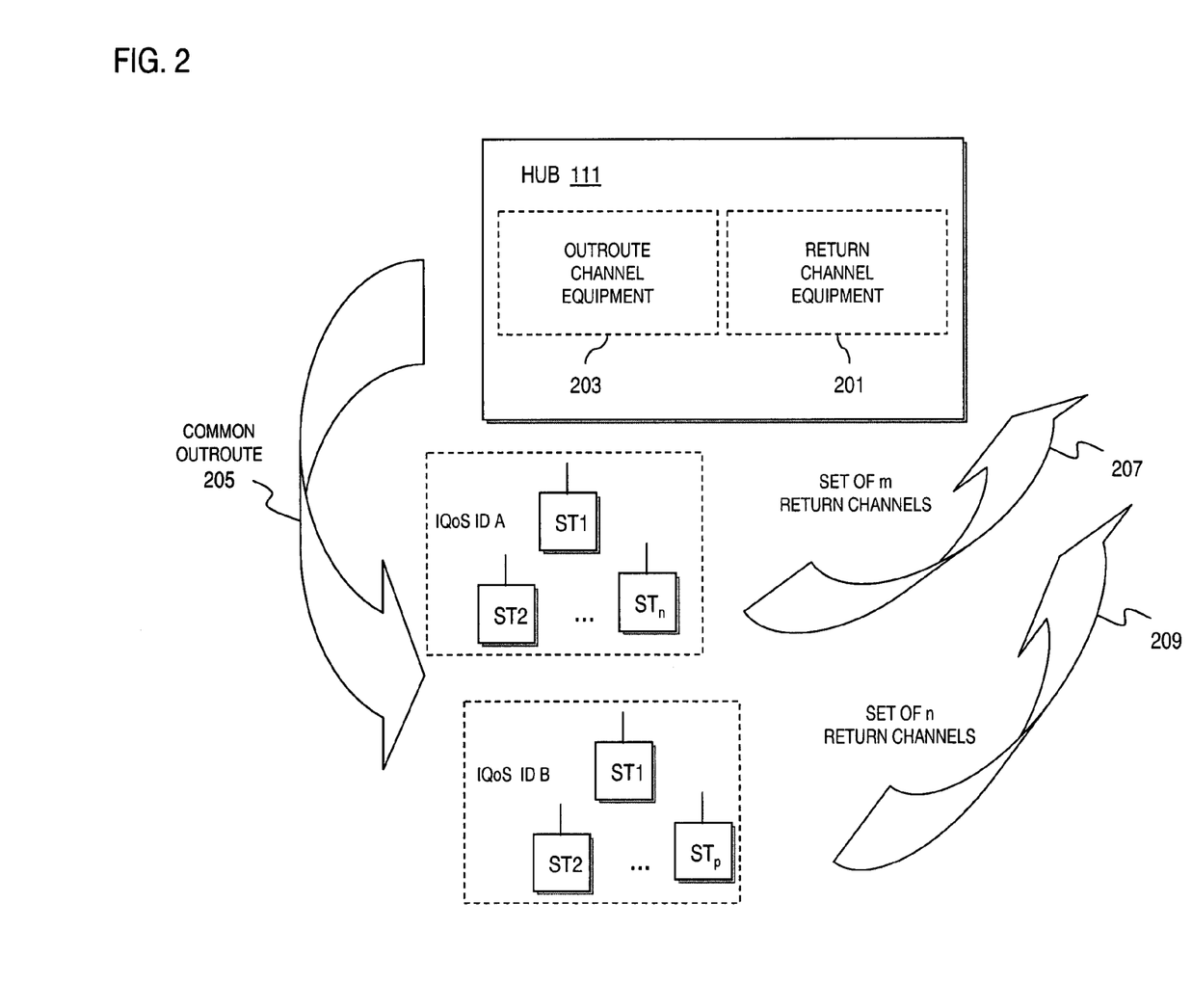
FIG. 2 is a diagram of an architecture of the hub in FIG. 1 for mapping return channel bandwidth to the satellite terminals, according to an embodiment of the present invention.

According to one embodiment of the present invention, each subset of terminals 103, 105, 107, 109, is issued a unique Inroute Quality of Service Identifier (IQoS ID) as part of a service level agreement. Such an ID is configured in all the terminals that are commissioned, as well as in some of the equipment in the hub 111, e.g., return channel equipment (as shown in FIG. 2). Because each enterprise is likely to require the same quality of service level throughout the enterprise, the STs 103, 105 are assigned an IQoS ID A, and the STs 107, 109 are given an IQoS ID B. Return channel bandwidth is dynamically mapped to customer terminals through, in an exemplary embodiment, messages sent from the hub 111 on the outroute. As used herein, the terms "resource", "return channel", "inroute", and "uplink channel" are synonymously used to denote a communication channel established via the satellite 101 to transport data from the STs 103, 105, 107, 109 to the hub 111. The terms "receive channel", "outroute" and "downlink channel" refer to a communication channel carrying traffic from the hub 111 to the STs 103, 105, 107, 109.

At commissioning, the STs 103, 105, 107, 109 are configured with a set of parameters (which include the IQoS ID) required to access the resource. The hub 111 is responsible for allocating inroute bandwidth, and can do so without any knowledge of the identity of the users that are capable of using the system's resources. This capability enhances scalability in the system 100. Also, the system 100 is secured against unauthorized use through advanced encryption methods, as explained below.

Additionally, the system 100 can allow for continuous utilization of the network inroute resources (inroutes or return channels) by multiplexing users of different enterprises on the same set of return channels. The return channel can include multiple carriers, each operating at speeds, for example, of 64 kbps, 128 kbps, or 256 kbps. Each of these carriers is a TDMA (Time Division Multiple Access) stream, which employs several transmission schemes.

The NOC 111 manages and controls communication services and operations. For example, the NOC 111 provisions and identifies the communication channels that are to be allocated. Additionally, the NOC 111 is responsible for controlling the bandwidth that is made available to the STs 103, 105, 107, 109.

Bandwidth on any inroute group (set of inroutes) is available to any terminal that is able to use it. In other words, the STs 103, 105, 107, 109 are totally trusted. Because authentication can be performed in real time at the hub 111, the IQoS ID can be configured in the clear at the terminal. This provides a strong defense technique, most suitable for small groups of users. The hub 111 does not need to perform the admission control function, or have knowledge of permissible or authorized terminals, as the information, e.g., IQoS ID, is securely loaded into the terminals. This approach provides the advantage that the network of STs 103, 105, 107, 109 can be expanded without any change in the configuration of the return channel equipment within the hub 111.

FIG. 2 is a diagram of an architecture of the hub in FIG. 1 for mapping return channel bandwidth to the satellite terminals, according to an embodiment of the present invention. As shown, the hub 111 of the system 100 includes return channel equipment 201 for interfacing with return channels, as well as outroute channel equipment 203 to transmit signals over an outroute 205 to the terminals associated with IQoS ID A and IQoS ID B. In this example, the outroute 205 is a common channel. By contrast, the terminals utilize different sets of return channels, according to the assigned IQoS ID. Specifically, Enterprise A with IQoS ID A employs a set of m return channels 207, and Enterprise B with IQoS ID B transmits over a set of n return channels 209.

In this example, Enterprise A has n terminals ($ST_1, \ldots, ST_n$), where each terminal is configured with IQoS ID A. Similarly, Enterprise B has p terminals ($ST_1, \ldots, ST_p$), each with identifier, IQoS ID B. The hub 111 associates the sets of return channels with the respective identifiers and advertises this mapping via the common outroute 205, using a dedicated outroute messaging protocol. Each set (group) of inroutes is uniquely identified within the system 100 through the identifier.

Figure 3:
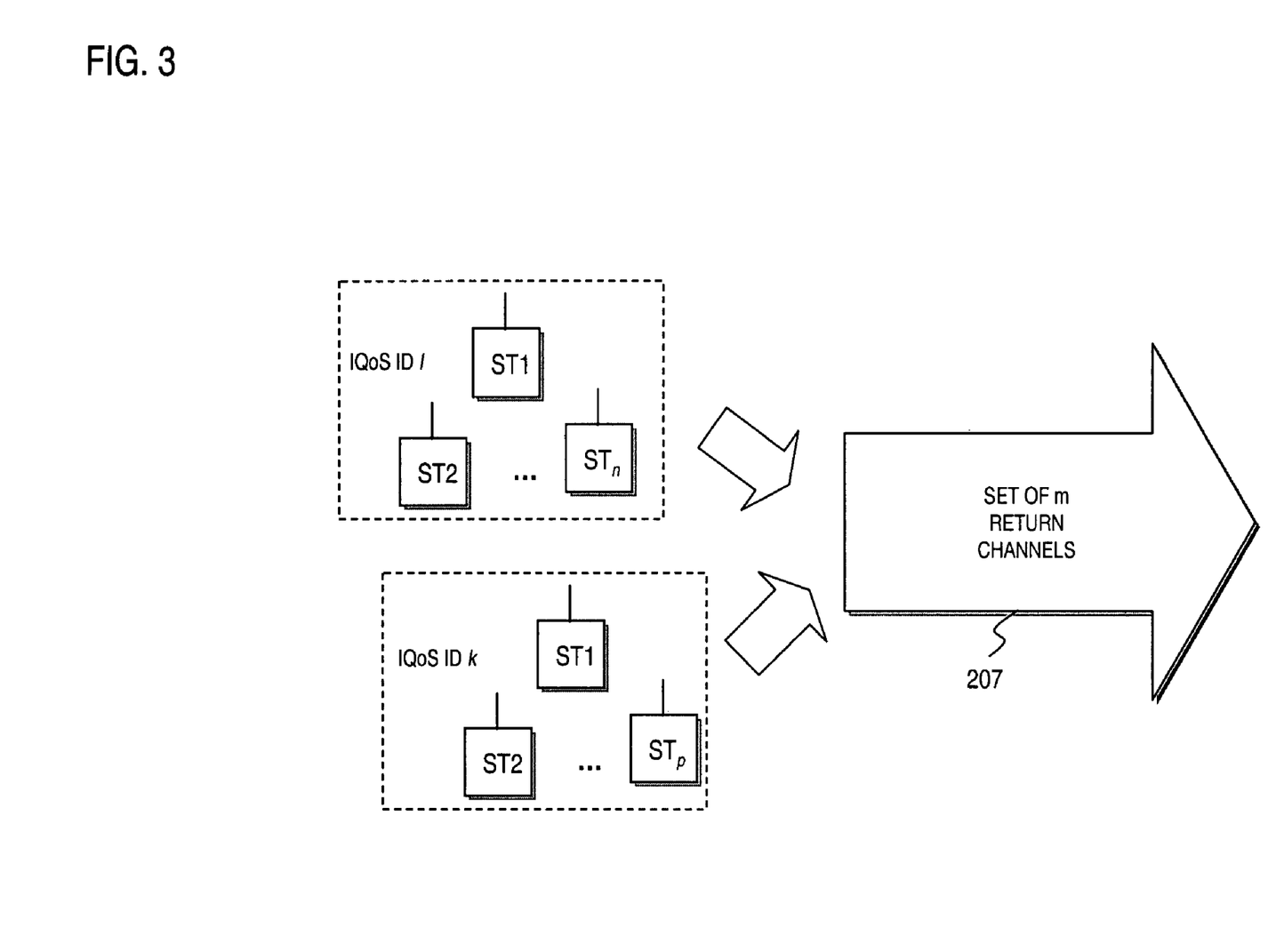
FIG. 3 is a diagram showing the capability to share the inroute bandwidth among different enterprises, in accordance with an embodiment of the present invention.

FIG. 3 is a diagram showing the capability to share the inroute bandwidth among different enterprises, in accordance with an embodiment of the present invention. As previously mentioned, the system 100 can improve utilization of the return channels by multiplexing traffic from terminals associated with different IQoS IDs upon a common set of return channels. This approach thus provides a higher return on investment for the service provider of the system 100 by associating multiple enterprises with the same set of inroutes. Each enterprise is guaranteed a minimum amount of return channel bandwidth and can use more if available (not used by the other parties).

For the purposes of explanation, it is assumed that enterprises 1 and k are sharing the same set of return channels (where k>1); i.e., that of group m. The mapping can be simply represented as a triplet (l, k, m). In an exemplary embodiment, the first two symbols in the triplet represent the start and end of a sorted range of IQoS IDs. Enterprises with IQoS IDs in this range have bandwidth dedicated on inroute group m. Under this scenario, the range is simple, containing only two IQoS IDs. Depending on the amount of bandwidth available on the inroute group and the customer requirements, this range can identify one or more enterprises. Maximum benefits in terms of inroute performance are achieved by identifying enterprises with diverse usage patterns and mapping them to the same set of inroutes, as shown.

An enterprise can add more sites and can use the service as soon as the newly installed terminals are correctly configured with the proper IQoS ID. This approach scales up easily because it does not involve any configuration change for the return channel equipment 201 (FIG. 2) of the hub 111.

Figure 4:
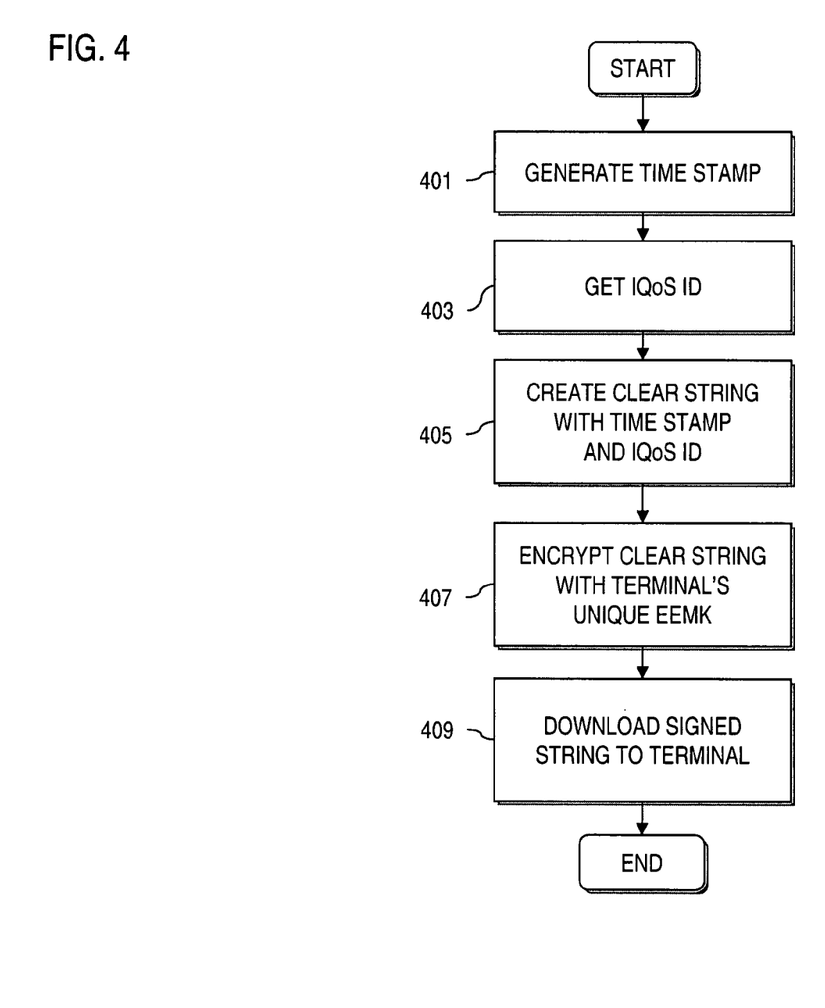
FIG. 4 is a flowchart of a process for generating secure inroute identifiers for the terminals in the system of FIG. 1.

FIG. 4 is a flowchart of a process for generating secure inroute identifiers for the terminals in the system of FIG. 1. According to an embodiment of the present invention, the IQoS ID is stored in the terminal (e.g., STs 103, 105, 107, 109) in encrypted format during installation. Also, during installation, the hub 111 generates an encrypted string containing the IQoS ID and the registration time. Hence, in step 401, a time stamp is generated, and the IQoS ID that is assigned to the particular terminal (e.g., ST 103) is obtained 403. The hub 111 then creates a string that is in the clear using the time stamp and the IQoS ID, as in step 405. Next, the string is encrypted using an encryption key that is unique to the particular terminal 103, per step 407. For instance, the string can be encrypted using the terminal's Effective Encryption Master Key (EEMK), which is known at the hub 111. The encrypted string can only be used by one terminal 103 as the EEMK is not transferable. This information is then downloaded, as in step 409, into the terminal 103, which stores the information in non-volatile Random Access Memory (NVRAM) together with the clear forms of the IQoS ID and time stamp.

After obtaining the information transmitted by the hub 111, the terminal can determine the proper mapping to the return channels.

Figure 5:
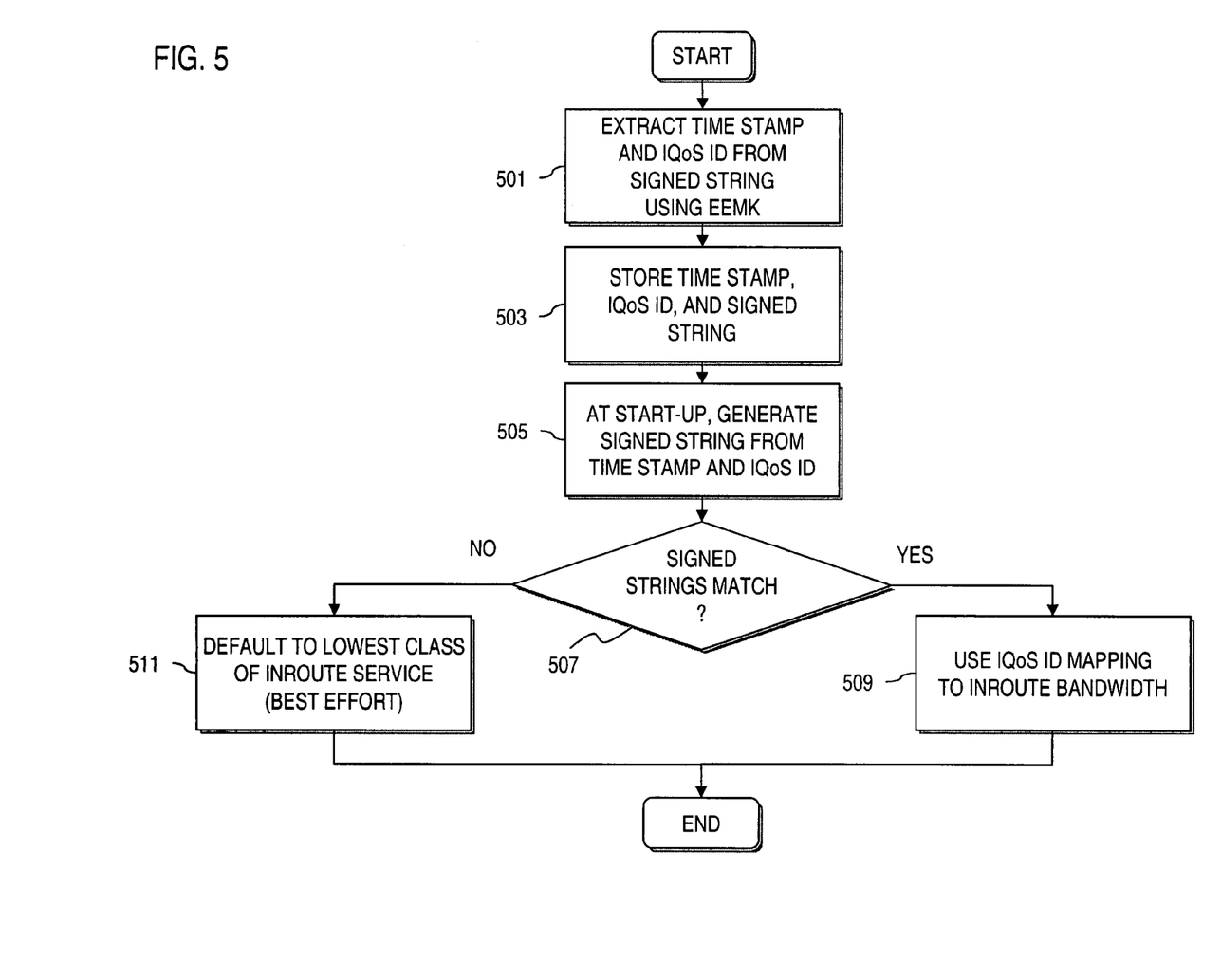
FIG. 5 is a flowchart of a process for utilizing inroute bandwidth based upon an inroute identifier, in accordance with an embodiment of the present invention.

FIG. 5 is a flowchart of a process for utilizing inroute bandwidth based upon an inroute identifier, in accordance with an embodiment of the present invention. Continuing with the example of FIG. 4, as part of an initialization process, the terminal 103 reads the time stamp and IQoS ID, signs them with its EEMK and compares the result to the original string downloaded from the hub 111. In step 501, the time stamp and IQoS ID are extracted from the signed string, as received from the hub 111. This extracted information is stored in the NVRAM, per step 503. At start-up, the terminal 103, as in step 505, generates a signed string from the extracted information—namely, the time stamp and the IQoS ID.

Next, the terminal 103 determines whether the two signed strings (i.e., download string and the locally generated string) match, per step 507. The IQoS ID, which maps to a set of return channels, is only used if the two strings compare successfully (step 509). Otherwise, the terminal 103 defaults to a lowest QoS level, such as a best effort service, per step 511.

The above process provides a secure mechanism for accessing resources of the system 100. For example, if a terminal attempts to change the IQoS ID without authorization in an attempt to take advantage of a higher class of service, an opposite outcome results. Notably, a non-matching IQoS ID triggers a default to a best effort service. That is, the terminal 103 will not use its original IQoS ID and will default to a best effort type of inroute access. Consequently, all the privileges associated with the inroute quality plan are lost.

At any time, the terminal 103 can be reconfigured from the hub 111. A reconfiguration is needed when the terminal 103 changes the class of inroute service or after unexpected failures as part of a recovery process. The terminal 103 accepts the change if the signed string received from the hub 111 contains a time stamp that is newer than the one stored in clear in the NVRAM.

The mechanism described above protects the system 100 against unauthorized use of inroute bandwidth. The processes detailed above can be executed through a variety of hardware and/or software configurations.

Figure 6:
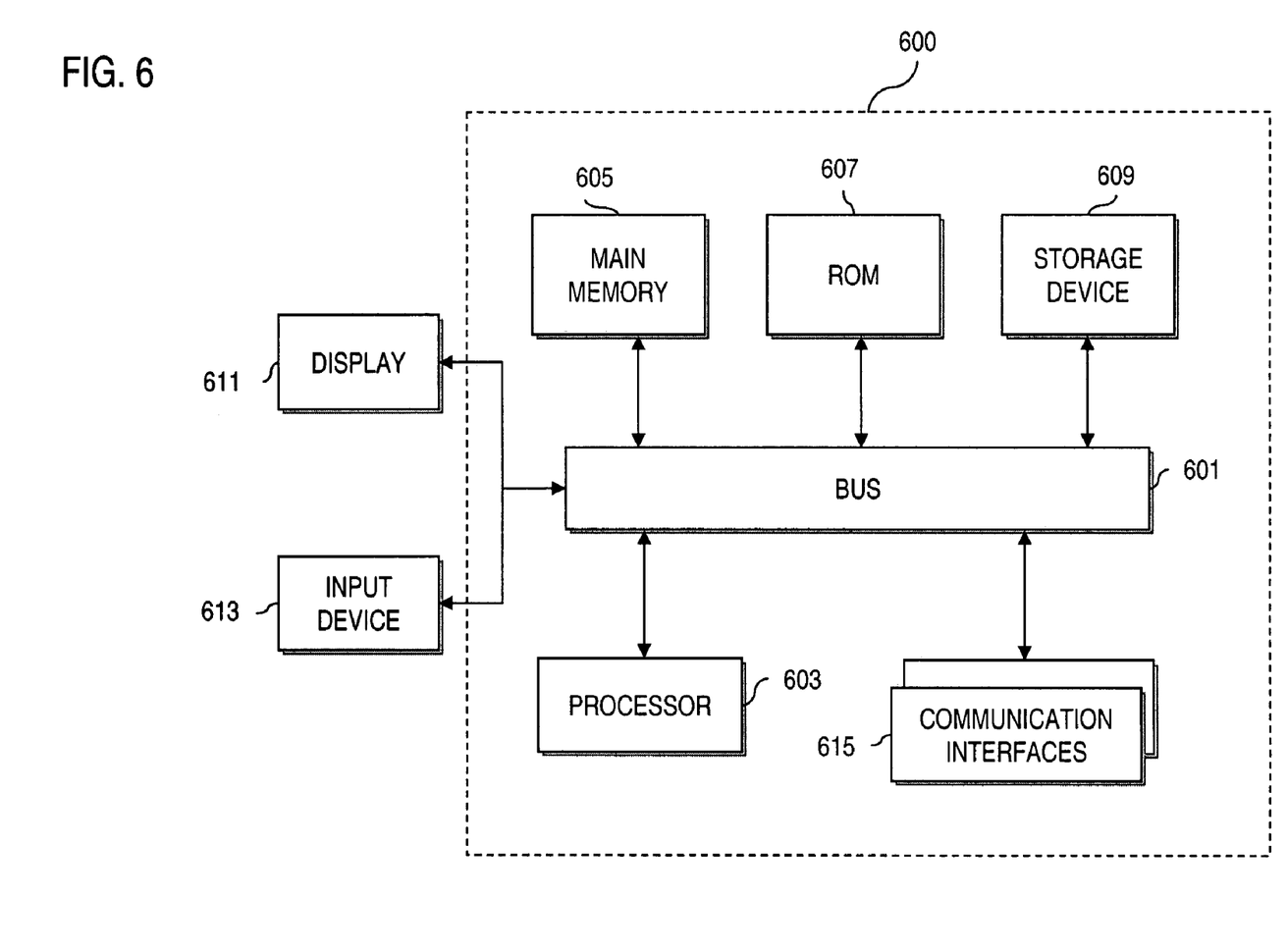
FIG. 6 is a diagram of hardware that can be used to implement an embodiment of the present invention.

FIG. 6 illustrates a computer system 600 upon which an embodiment according to the present invention can be implemented. The computer system 600 includes a bus 601 or other communication mechanism for communicating information, and a processor 603 coupled to the bus 601 for processing information. The computer system 600 also includes main memory 605, such as a random access memory (RAM) or other dynamic storage device, coupled to the bus 601 for storing information and instructions to be executed by the processor 603. Main memory 605 can also be used for storing temporary variables or other intermediate information during execution of instructions to be executed by the processor 603. The computer system 600 further includes a read only memory (ROM) 607 or other static storage device coupled to the bus 601 for storing static information and instructions for the processor 603. A storage device 609, such as a magnetic disk or optical disk, is additionally coupled to the bus 601 for storing information and instructions.

The computer system 600 may be coupled via the bus 601 to a display 611, such as a cathode ray tube (CRT), liquid crystal display, active matrix display, or plasma display, for displaying information to a computer user. An input device 613, such as a keyboard including alphanumeric and other keys, is coupled to the bus 601 for communicating information and command selections to the processor 603. Another type of user input device is cursor control 615, such as a mouse, a trackball, or cursor direction keys for communicating direction information and command selections to the processor 603 and for controlling cursor movement on the display 611.

According to one embodiment of the invention, the processes of FIGS. 4 and 5 are provided by the computer system 600 in response to the processor 603 executing an arrangement of instructions contained in main memory 605. Such instructions can be read into main memory 605 from another computer-readable medium, such as the storage device 609. Execution of the arrangement of instructions contained in main memory 605 causes the processor 603 to perform the process steps described herein. One or more processors in a multi-processing arrangement may also be employed to execute the instructions contained in main memory 605. In alternative embodiments, hard-wired circuitry may be used in place of or in combination with software instructions to implement the embodiment of the present invention. Thus, embodiments of the present invention are not limited to any specific combination of hardware circuitry and software.

The computer system 600 also includes a communication interface 617 coupled to bus 601. The communication interface 617 provides a two-way data communication coupling to a network link 619 connected to a local network 621. For example, the communication interface 617 may be a digital subscriber line (DSL) card or modem, an integrated services digital network (ISDN) card, a cable modem, or a telephone modem to provide a data communication connection to a corresponding type of telephone line. As another example, communication interface 617 may be a local area network (LAN) card (e.g. for Ethernet™ or an Asynchronous Transfer Model (ATM) network) to provide a data communication connection to a compatible LAN. Wireless links can also be implemented. In any such implementation, communication interface 617 sends and receives electrical, electromagnetic, or optical signals that carry digital data streams representing various types of information. Further, the communication interface 617 can include peripheral interface devices, such as a Universal Serial Bus (USB) interface, a PCMCIA (Personal Computer Memory Card International Association) interface, etc.

The network link 619 typically provides data communication through one or more networks to other data devices. For example, the network link 619 may provide a connection through local network 621 to a host computer 623, which has connectivity to a network 625 (e.g. a wide area network (WAN) or the global packet data communication network now commonly referred to as the "Internet") or to data equipment operated by service provider. The local network 621 and network 625 both use electrical, electromagnetic, or optical signals to convey information and instructions. The signals through the various networks and the signals on network link 619 and through communication interface 617, which communicate digital data with computer system 600, are exemplary forms of carrier waves bearing the information and instructions.

The computer system 600 can send messages and receive data, including program code, through the network(s), network link 619, and communication interface 617. In the Internet example, a server (not shown) might transmit requested code belonging an application program for implementing an embodiment of the present invention through the network 625, local network 621 and communication interface 617. The processor 603 may execute the transmitted code while being received and/or store the code in storage device 69, or other non-volatile storage for later execution. In this manner, computer system 600 may obtain application code in the form of a carrier wave.

The term "computer-readable medium" as used herein refers to any medium that participates in providing instructions to the processor 603 for execution. Such a medium may take many forms, including but not limited to non-volatile media, volatile media, and transmission media. Non-volatile media include, for example, optical or magnetic disks, such as storage device 609. Volatile media include dynamic memory, such as main memory 605. Transmission media include coaxial cables, copper wire and fiber optics, including the wires that comprise bus 601. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, the above approach provides a secure access to return channels of a satellite communication system. Return channel bandwidth is allocated using identifiers based on QoS levels as dictated by service level agreements. Each of the identifier maps to one or more return channels, and can be assigned to terminals during installation. A hub transmits a signed string using an encryption key to a particular terminal. The encryption key is unique to the particular terminal. In operation, the terminal generates its own encrypted string using its identifier, and compares the generated string with the one received from the hub. A successful match permits the terminal to utilize the return channels corresponding to the identifier. However, a non-match can result in the terminal being defaulted to a lowest QoS level. This approach advantageously enhances scalability and security of the satellite communication system.

While the present invention has been described in connection with a number of embodiments and implementations, the present invention is not so limited but covers various obvious modifications and equivalent arrangements, which fall within the purview of the appended claims.

What is claimed is:

1. A method for providing secure access to resources in a radio communication system including a hub communicating with a plurality of terminals, the method comprising:

determining a quality of service level (QoS) corresponding to one of the terminals;

assigning an identifier to the one terminal for communicating over one of a plurality of return channels that are in the direction of the one terminal to the hub, the identifier associating a subset of the terminals with the QoS level, the subset including the one terminal;

generating a first encrypted message based on an identifier stored at the hub and a time stamp; and transmitting the first encrypted message to the one terminal, wherein the one terminal is configured to generate a second encrypted message from the assigned identifier and the time stamp and to determine whether the first encrypted message and the second encrypted message match, wherein if there is a match, use of the one return channel is permitted prior to the terminal transmitting a message to the hub.

2. A method according to claim 1, wherein the QoS level is predetermined based on a service agreement for the one terminal.

3. A method according to claim 1, wherein the second encrypted message is encrypted based on an Effective Encryption Master Key (EEMK) unique to the one terminal.

4. A method according to claim 1, wherein another identifier is associated with another subset of the terminals, and the one return channel is part of a subset of the return channels, the method further comprising:

mapping the identifier and the other identifier to the subset of the return channels.

5. A method according to claim 4, further comprising:
advertising the associations between the identifiers and the return channels to the terminals.

6. A method according to claim 1, further comprising:
configuring the one terminal with the identifier during commissioning of the one terminal, wherein the terminals are satellite terminals.

7. A computer-readable storage medium bearing instructions for providing secure access to resources in a radio communication system including a hub communicating with a plurality of terminals, said instruction, being arranged, upon execution, to cause one or more processors to perform the method of claim 1.

8. A method for accessing resources in a radio communication system, the method comprising:
retrieving an assigned identifier that maps to one or more return channels of the radio communication system, wherein the assigned identifier associates a subset of terminals in the radio communication system with a quality of service (QoS) level;
selecting, based upon the assigned identifier, the one or more of the return channels for transmission of data;
downloading a first encrypted message based on an identifier stored at a hub of the radio communication system and a time stamp with a terminal;
generating a second encrypted message from the assigned identifier and the time stamp with the terminal; and
determining whether the first encrypted message and the second encrypted message match,
wherein if there is a match, use of the selected one or more return channels is permitted prior to the terminal transmitting a message to the hub.

9. A method according to claim 8, wherein the QoS level is predetermined based on a service agreement.

10. A method according to claim 8, wherein the second encrypted message is encrypted based on a unique Effective Encryption Master Key (EEMK).

11. A method according to claim 8, wherein another assigned identifier is associated with another subset of the terminals, and the one or more return channels are part of a subset of the return channels, wherein the assigned identifiers are mapped to the subset of the return channels.

12. A method according to claim 11, further comprising:
receiving a message, from the hub, specifying the associations between the assigned identifiers and the return channels.

13. A computer-readable storage medium bearing instructions for accessing resources in a radio communication system, said instruction, being arranged, upon execution, to cause one or more processors to perform the method of claim 8.

14. An apparatus for accessing resources in a radio communication system, the apparatus comprising:
a memory configured to store an encrypted string; and
a processor configured to extract a time stamp and an identifier from the encrypted string, wherein the identifier maps to one or more return channels of the radio communication system and associates a subset of terminals in the radio communication system with a quality of service (QoS) level,
wherein the memory and the processor are configured to operate to:
generate a second encrypted string from the identifier and the time stamp,
determine whether the first encrypted string and the second encrypted string match, and
if a match is determined, permit the use of the identified one or more return channels prior to the terminal transmitting a message to a hub.

15. An apparatus according to claim 14, wherein the QoS level is predetermined based on a service agreement.

16. An apparatus according to claim 14, wherein
the second encrypted string is encrypted based on an Effective Encryption Master Key (EEMK) unique to the apparatus.

17. An apparatus according to claim 14, wherein another identifier is associated with another subset of the terminals, and the one or more return channels are part of a subset of the return channels, wherein the identifier and the other identifier are mapped to the subset of the return channels.

18. An apparatus according to claim 17, further comprising:
receiving a message, from the hub within the radio communication system, specifying the associations between the identifiers and the return channels.

* * * * *